(12) United States Patent
Marsland, Jr.

(10) Patent No.: US 9,768,864 B2
(45) Date of Patent: Sep. 19, 2017

(54) TEST AND MEASUREMENT DEVICE FOR MEASURING INTEGRATED COHERENT OPTICAL RECEIVER

(71) Applicant: Tektronix, Inc., Beaverton, OR (US)

(72) Inventor: Robert A. Marsland, Jr., Madison, WI (US)

(73) Assignee: TEKTRONIX, INC., Beaverton, OR (US)

( * ) Notice: Subject to any disclaimer, the term of this patent is extended or adjusted under 35 U.S.C. 154(b) by 103 days.

(21) Appl. No.: 14/873,997

(22) Filed: Oct. 2, 2015

(65) Prior Publication Data

US 2016/0149637 A1 May 26, 2016

Related U.S. Application Data

(60) Provisional application No. 62/083,148, filed on Nov. 21, 2014.

(51) Int. Cl.
*H04B 17/00* (2015.01)
*H04B 10/077* (2013.01)
(Continued)

(52) U.S. Cl.
CPC ......... *H04B 10/077* (2013.01); *H01S 3/0014* (2013.01); *H01S 3/10053* (2013.01); *H04B 10/63* (2013.01)

(58) Field of Classification Search
CPC ..... H04B 10/077; H04B 10/63; H01S 3/0014; H01S 3/10053
(Continued)

(56) References Cited

U.S. PATENT DOCUMENTS 4,492,962 A 1/1985 Hansen
5,202,745 A * 4/1993 Sorin ................. G01M 11/3172
356/479

(Continued)

FOREIGN PATENT DOCUMENTS

DE 4110138 C1 3/1992
EP 0319174 A2 6/1989
(Continued)

OTHER PUBLICATIONS

Extended European Search Report for European Patent Application No. 15195904.6, mailed Apr. 15, 2016, 8 pages.
(Continued)

*Primary Examiner* — Juan A Torres
(74) *Attorney, Agent, or Firm* — Marger Johnson

(57) ABSTRACT

Embodiments of the invention include a phase adjustor for adjusting a phase angle of a local oscillator relative to a phase angle of a signal input of a Device Under Test (DUT). Some embodiments include a laser source for a lightwave component analyzer and an optical phase adjustor. The lightwave component analyzer drives a first test input to the DUT. An output of the DUT drives an output of the optical phase adjustor adapted to couple to an oscillator input to the DUT. A monitor selector is also included that accepts at least two outputs of the DUT and is structured to transmit a selected output of the DUT to the phase adjust driver. The phase adjust driver is structured to drive the optical phase adjustor with a control signal based on the output of the DUT that is selected by the monitor selector.

19 Claims, 3 Drawing Sheets

(51) Int. Cl.
*H01S 3/10* (2006.01)
*H01S 3/00* (2006.01)
*H04B 10/63* (2013.01)

(58) Field of Classification Search
USPC .......................................................... 398/25
See application file for complete search history.

(56) References Cited

U.S. PATENT DOCUMENTS

| | | |
|---|---|---|
| 2002/0113972 A1 | 8/2002 | Rosenfeldt et al. |
| 2004/0208643 A1 | 10/2004 | Roberts et al. |
| 2006/0192975 A1* | 8/2006 | Sato ................... G01B 11/2441 356/497 |
| 2008/0024785 A1 | 1/2008 | Froggatt et al. |
| 2009/0103100 A1 | 4/2009 | Froggatt et al. |
| 2011/0129213 A1* | 6/2011 | Painchaud ........... H04B 10/676 398/16 |
| 2014/0341564 A1 | 11/2014 | Westlund et al. |
| 2016/0146869 A1 | 5/2016 | Marsland, Jr. et al. |
| 2016/0149637 A1 | 5/2016 | Marsland, Jr. et al. |
| 2016/0164599 A1 | 6/2016 | Heismann |

FOREIGN PATENT DOCUMENTS

| | | |
|---|---|---|
| EP | 0479256 A2 | 4/1992 |
| EP | 2026478 A1 | 2/2009 |
| GB | 2213026 A | 8/1989 |

OTHER PUBLICATIONS

Extended European Search Report for European Patent Application No. 15195909.5, mailed Aug. 25, 2016, 8 pages.

* cited by examiner

TEST AND MEASUREMENT DEVICE FOR MEASURING INTEGRATED COHERENT OPTICAL RECEIVER

CROSS-REFERENCE TO RELATED APPLICATIONS

This application claims benefit from U.S. Provisional Application 62/083,148, filed Nov. 21, 2014, entitled TEST AND MEASUREMENT DEVICE, the contents of which are herein incorporated by reference.

FIELD OF INVENTION

This disclosure generally relates to test and measurement devices, and, more particularly, to a test and measurement device for testing the frequency response of an Integrated Coherent Optical Receiver (ICR) using a Lightwave Component Analyzer (LCA).

BACKGROUND

Optical communication systems transmit data using electromagnetic light signals in optical fiber and/or free space (for example, building to building, ground to satellite, satellite to satellite, etc.). The electromagnetic carrier wave is modulated to carry the data. Optical communication in optical fiber typically involves: generating the optical signal, relaying the signal on an optical fiber (including measures to reduce/mitigate attenuation of, interference with and/or distortion of the light signal), processing a received optical signal, and converting the signal into a useful electrical signal. Transmitters can be semiconductor devices such as laser diodes, producing coherent light for transmission. A number of receivers have been developed for processing a transmitted lightwave optical signal to provide processed optical signal input(s) to one or more photodetectors, which convert light into electricity.

A coherent receiver, such as an Integrated Coherent Optical Receiver (ICR), converts a modulated optical signal into four electrical signals corresponding to an "in-phase" (I) and "quadrature" (Q) optical signal components of the two optical polarization states, vertical and horizontal. These components can be processed to recover the optically transmitted data regardless of modulation type. Together these four output electrical signals carry all or nearly all of the information conveyed by the optical signal. The electrical outputs of the ICR provide the I and Q mixer signals for the two polarizations.

Testing an ICR presents a special challenge in that the output stage is a balanced detector pair often followed by a differential amplifier with differential outputs. The fact that there are four differential outputs (I and Q each for X and Y polarizations), compounds the difficulty. A simple coherent receiver is composed of a local-oscillator laser, an optical coupler, and one or more photodetectors that can be in a "balanced" configuration that cancels photocurrents and eliminates DC terms and the related excess intensity noise.

The balanced detection and differential amplification of the ICR ensure that any signal put into only the signal port or only the Local Oscillator (LO) port of the ICR will be rejected unless it is possible to block one of the photodiodes to break the balanced detection. Although early versions of ICRs allowed physical access to interrupt a light signal and thereby break the balanced detection, this is not possible on modern integrated components, which are instead typically intrinsically sealed. Getting any meaningful signal out of the ICR therefore requires both a signal and a local oscillator input. A problem is that the optical LO input must be phase coherent with the test signal. The precise optical phase of the local oscillator signal will affect whether either one or both of the output diodes are illuminated with the test signal.

Since getting any meaningful signal out of the ICR requires both a signal and a local oscillator input, both the frequency and phase relationship between the signal and local oscillator are important. While it is routine to simply connect two single-frequency lasers, one to the Signal and one to the LO port to get a beat-frequency output at the frequency difference between the lasers, this method is good only for determining the magnitude of the frequency response. The phase response of a coherent receiver is also important. In addition to maintaining 90-degree relative phase between I and Q outputs, the receiver also must have low group-delay and skew variation over modulation frequency as well as good Common Mode Rejection Ratio (CMRR) vs. frequency.

Measuring phase response vs. frequency requires a stable phase reference unless both low and high frequency components are supplied simultaneously with a known phase relationship. For example, a pulsed laser has both low and high frequency harmonics simultaneously. However, the pulsed laser still requires some sort of LO input which creates a very similar difficulty to the frequency domain approach.

Embodiments of the invention address these and other limitations of the prior art.

SUMMARY OF THE INVENTION

Embodiments of the invention include a phase adjustor for adjusting a phase angle of a local oscillator relative to a phase angle of a signal input of a Device Under Test (DUT). Some embodiments include a laser source for a lightwave component analyzer and an optical phase adjustor or modulator, which may be a loop stretcher, driven by a phase adjust driver. The lightwave component analyzer drives a first test input to the DUT. An output of the DUT drives an output of the controllable loop of fiber optic cable adapted to couple to an oscillator input to the DUT. An monitor selector is also included that accepts at least two outputs of the DUT and is structured to transmit a selected monitored channel of the DUT to the phase adjust driver. The phase adjust driver is structured to drive the controllable loop of fiber optic cable with a control signal based on the output of the DUT that is selected by the monitor selector.

In some embodiments a signal path from the laser source through the lightwave component analyzer to the first test input to the DUT has a length within one meter of a length of a signal path from the laser source through the controllable loop of fiber optic cable to the oscillator input to the DUT.

In some embodiments the phase adjustor may adjust the phase angle of the local oscillator to approximately zero, while in other embodiments different phase adjustments are possible.

In other embodiments, methods for adjusting a phase angle of a local oscillator relative to a phase angle of a signal input of a Device Under Test (DUT) are described. Such methods may include generating a first laser signal having a fixed path length from a laser to a signal input of the DUT, generating a second laser signal having an adjustable length path from the laser to a local oscillator input of the DUT, selectively coupling an output of the DUT to a phase controller driver for the controllable loop of fiber optic cable, and driving the controllable loop of fiber optic cable with a control signal derived from the selected output of the DUT.

Further embodiments may also include a system for testing a Device Under Test (DUT), using the above described components.

BRIEF DESCRIPTION OF THE DRAWINGS

Reference is made to embodiments of the invention, examples of which may be illustrated in the accompanying figures. These figures are intended to be illustrative, not limiting. Although the invention is described in the context of these embodiments, it should be understood that this description is not intended to limit the scope of the invention to these particular embodiments.

DETAILED DESCRIPTION OF THE INVENTION

Figure 1:
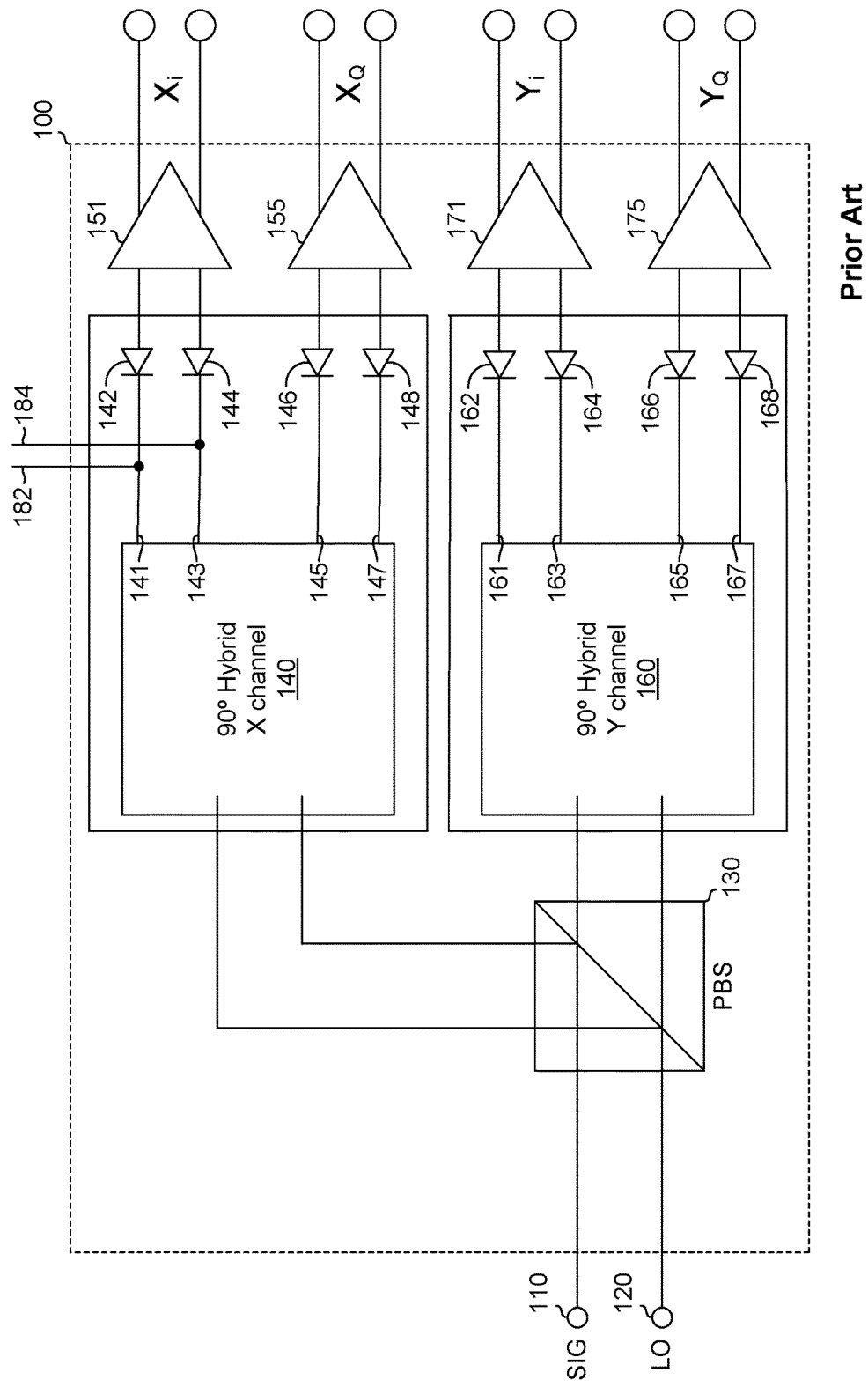
FIG. 1 is a block diagram illustrating components of an Integrated Coherent Optical Receiver to be tested using embodiments of the invention.

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. In the following discussion and in the claims, the terms "including" and "comprising" are used in an open-ended fashion, and thus should be interpreted to mean "including, but not limited to . . . ." Phrases such as "coupled to" and "connected to" and the like are used herein to describe a connection between two devices, elements and/or components and are intended (unless otherwise restricted specifically) to mean physically, optically and/or electrically either coupled directly together, or coupled indirectly together, for example via one or more intervening elements or components or via a wireless or other connection, where appropriate. The term "system" refers broadly to a collection of two or more components and may be used to refer to an overall system (e.g., a communication system, a receiving system, a testing system, a computer system or a network of such devices/systems), a subsystem provided as part of a larger system, and/or a process or method pertaining to operation of such a system or subsystem.

The most direct way to measure frequency response of an Optical/Electrical (OE) device is to use a Lightwave Component Analyzer (LCA). An LCA is essentially an electrical Vector Network Analyzer (VNA) coupled with electrical-to-optical (E/O) and optical-to-electrical (O/E) converters to extend the capability of the VNA to the optical domain. An example LCA is one of the N437x series made by KEYSIGHT TECHNOLOGIES of Colorado. The E/O converter in an LCA is typically a Mach-Zehnder optical modulator biased at quadrature. This is ideal for producing optical power signals that are proportional to the voltage input. Typically an O/E converter under test will convert the optical power back to an electrical voltage so that the VNA can process a linear voltage transfer function and via calibration extract the O/E transfer function.

However, ICRs convert optical electric field to voltage, not optical power to voltage. This difficulty can be dealt with so long as the absolute amplitude is not particularly important. This is in fact the case with a standard ICR test since the absolute amplitude is easily measured by other means.

Another difficulty with measuring the Device Under Test (DUT), as mentioned above, is that the ICR produces no output without a second optical signal, specifically the local oscillator. This difficulty is addressed by the inclusion of a phase controller including an optical phase-locked-loop that is the subject of this disclosure. Ultimately, the DUT is tested by generating the shape of the amplitude and phase response of the DUT at various frequencies. Embodiments of the invention allow such testing by using an LO having a tunable phase adjust.

As seen in FIG. 1, a generalized optical signal processor 100, which can be used as an optical signal receiver or an optical testing device, for example, accepts an unprocessed data signal beam 110 at a SIG input as well as a local oscillator beam 120 at an LO input. The optical signal processor 100 may also be referred to as a Device Under Test (DUT). In some embodiments the beams 110, 120 may be laser beams, but embodiments of the invention also work in typical RF frequencies. The laser used for the local oscillator 120 can be any suitable laser source and type (for example, continuous wave, pulsed, etc.). A polarized beam splitter 130 splits the beams 110, 120 into two channels. As noted below, and as will be appreciated by those skilled in the art, the local oscillator 120 should preferably be oriented so that sufficient reference local oscillator power is available downstream along any needed polarizations. In some embodiments discussed herein, such polarizations may be referred to as "horizontal" and "vertical" polarizations (as well as other orientation representations such as x-axis and y-axis, etc.), though such nomenclature only serves to describe the relative polarization orientations, as do references to 45° offsets and/or axes relative to such horizontal and/or vertical polarization orientations. Those skilled in the art will appreciate that many equivalent structures, apparatus, etc. are available once the relative polarization schemes, etc. are known.

An X-channel optical mixer 140 combines the signal 110 and LO inputs 120 of the X-channel to produce a differential in-phase (I) output on outputs 141, 143, and a differential quadrature (Q) output on outputs 145, 147. These outputs are directed to photodetectors, such as photosensitive diode pairs 142, 144, and 146, 148. The photodiodes 142, 144, 146, 148 of the signal processor 100 may be coupled to an amplifier, such as transimpedance amplifiers 151, 155, and/or other components well known to those skilled in the art and used to extract data from the signal beam 110. Embodiments of the invention operate even in absence of other components coupled to the photodiodes 142, 144, 146, 148. Current monitors 182, 184 may be coupled to the outputs of the photosensitive diode pairs 142, 144, respectively. Such a monitor allows each photodiode, referred to as P and N, for positive and negative, from each channel, to be monitored. For example, the current monitor 182 monitors the P photodiode of the Xi channel, while the current monitor 184 monitors the N photodiode of the Xi channel. Although not illustrated, each of the channels Xq, Yi, and Yq may include current monitors for the P and N photodiodes, so that each of the outputs of the photodiodes in each channel may be individually monitored.

Similarly, a Y-channel optical mixer 160 combines the signal 110 and LO inputs 120 of the Y-channel to produce a differential in-phase (I) output on outputs 161, 163, and a differential quadrature (Q) output on outputs 165, 167. These outputs are directed to photodetectors, such as photosensitive diode pairs 162, 164, and 166, 168. The photodiodes 162, 164, 166, 168 of the signal processor 100 of FIG. 1 are coupled to transimpedance amplifiers 171, 175, respectively, but such amplifiers are not needed to practice embodiments of the invention.

As mentioned above, it is difficult to test the frequency responses of the photodiodes of the X and Y channels without having physical access to block light to one of the pairs of diodes. It is also very difficult to test the frequency responses of the photodiodes without an ability to precisely control the frequency of the local oscillator beam 120, especially a local oscillator that oscillates at the very high optical carrier frequencies, such as 192 THz. Another problem exists in that the fiber carrying the signal 110 may have a different length than the fiber carrying the local oscillator 120, which makes it difficult to match phases of the signal and local oscillator. Therefore, embodiments of the invention provide an apparatus and method to hold the phase of the local oscillator extremely stable, and well matched to the phase of the signal, as well as being controllable, to facilitate measurement of the frequency responses of the photodiodes.

Figure 2:
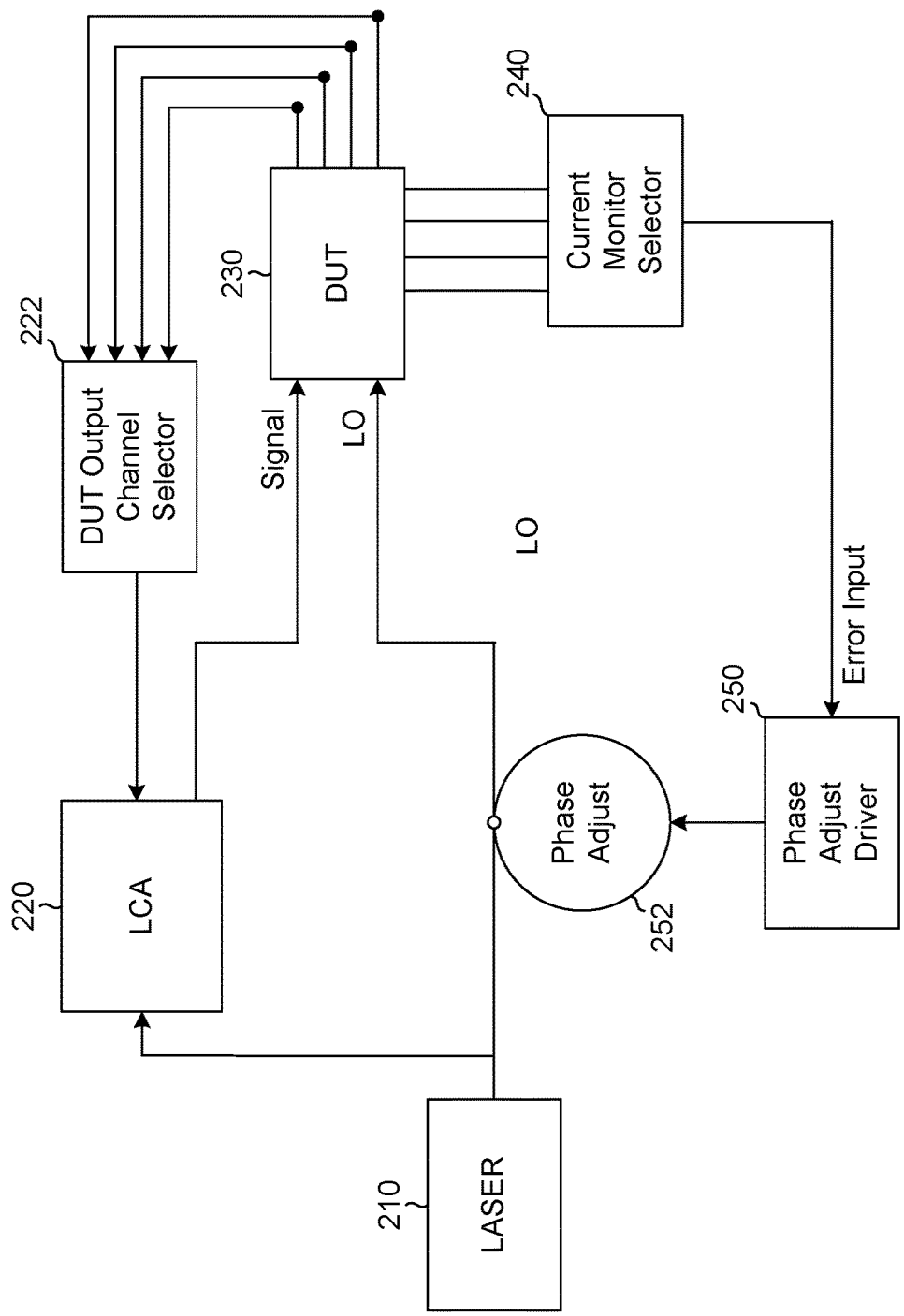
FIG. 2 is a block diagram illustrating components of a precise phase adjusting system that may be used in implementing embodiments of the invention.

FIG. 2 is a block diagram illustrating components that may be used in implementing embodiments of the invention. A laser 210 generates a signal that ultimately becomes the source of both the local oscillator and of a testing signal input to a DUT 230. The phase of the laser making the local oscillator is precisely controlled through an optical phase adjustor, which may be embodied by and referred to as a phase adjust loop 252, which is driven by a phase adjust driver 250, described in detail below. The laser 210 is also presented to an LCA 220, which creates a modulated light signal that is presented as a testing signal to the Signal input to the DUT 230. Thus, a single laser beam 210 is split and goes through separate controllable paths to ultimately become both the Signal and LO inputs to the DUT 230. Controlling the laser beam 210 allows the frequency response of the photodiodes of the DUT 230 to be tested over multiple frequencies, and therefore the DUT can be characterized.

The LCA 220 performs two functions in this system, one is to modulate the laser beam from the laser 210 to add characterizing data to be used as the Signal input of the DUT 230. The other function is to measure, based on the characterizing data supplied to it, the output from a selected one of the four output channels of the DUT 230. In the example illustrated in FIG. 1, the DUT 230 has four output channels, (I) and (Q) channels each for both the X and Y polarities. The outputs are connected to an output channel selector 222, which is controllable to provide the selected output channel of the DUT 230 to the LCA 220 for characterization. Also as mentioned above, each of the output channels may include differential outputs formed by a coupled pair of outputs.

The phase adjust driver 250 controls a phase adjust loop 252 to select particular phases and provide a stable phase reference of the local oscillator relative to the signal. The level to which the phase adjust driver 250 is driven is related to its input, called an error input, for reasons described below. Also for reasons described below, the error input to the phase adjust driver 250 is a selected one or pair of current monitors from the DUT 230. For example, the error input to the phase driver could be the current monitors 182, 184 of the Xi channel as illustrated in FIG. 1, or any of the other monitored channels of the optical signal processor 100 of FIG. 1. The error input to the phase adjust driver 250 can be perform both a dc-bias function as well as the phase adjust function. In this way it can completely take over for the user bias circuitry of prior solutions, eliminating the need for any such interaction between the test system and the bias circuitry of the user. In addition, the phase adjust driver 250 can also be used to measure photocurrents of the DUT 230 outputs to determine DC Common Mode Rejection Ratio (CMRR) for example.

The phase adjust loop 252 may be embodied by a piezo phase stretcher. A piezo phase stretcher has loops of fiber optic cable looped around a piezoelectric element. Energizing the piezoelectric element causes the element to expand, which lengthens the path of the fiber optic material looped around it. Lengthening the path changes the distance the light travels through the path. Lengthening only one of the paths, Signal or LO, allows the phase of one signal to be adjusted relative to the other. In one embodiment the phase adjust loop 252 may allow light traveling through the loop to be adjusted extremely accurately, such as on the order of tenths or hundredths of a picosecond. In other words, by using the phase stretcher, the fiber length that the laser light travels through may be lengthened to cause the light traveling through it to take, for example, 0.1 ps longer than the fiber in its non-stretched length. This changes the relative phase of the light signals between the LO and the Signal inputs of the DUT 230. Therefore, driving the phase adjust loop 252 gives phase precise phase control to the system. The length of both laser paths from the laser 210 for both the Signal and LO may be set up to be similar length to one another, for example within one meter. The phase adjust loop in some embodiments may be an OptiPhase PZ1-PM4-APC-E-155B, and may have a fiber length of 12.36 m, for instance.

Providing a signal to the DUT that is phase stable and controllably locked relative to the LO in a known relationship allows the same results to be obtained from the DUT as if the balanced detection was able to be physically blocked, as in previous solutions, as proven by the theory of operation shown below.

Signal Field: $\widetilde{E_1} = E_1 e^{j\omega 1 t} = E_{10} e^{j\theta_1} e^{j\omega 1 t}$  Equation (1):

LO Field: $\widetilde{E_2} = E_2 e^{j\omega 1 t} = E_{20} e^{j\theta_2} e^{j\omega 1 t}$  Equation (2):

For simple amplitude modulation of $E_{10}$ with a balanced drive, the output of the DUT 230 for a particular polarization will be proportional to:

I: $E_{10} E_{20} \cos(\theta_1 - \theta_2)$  Equation (3):

Q: $E_{10} E_{20} \sin(\theta_1 - \theta_2)$  Equation (4):

A phase-locked loop with the Q dc level output provided as the error input can then be used to drive the $\theta_1 - \theta_2$ to zero, providing an output on the I-channel that is proportional to $E_{10}$, which gives the response of the positive diode of the differential pair, such as the diode 142 of the differential pair of diodes 142, 144 of FIG. 1. Driving $\theta_1 - \theta_2$ to $\pi$ gives $-E_{10}$, which is the response of the negative diode, such as diode 144. This response signal may be selected in the phase adjust driver 250 by changing the sign of the gain. As illustrated in FIG. 2, any of the four photodiode pair outputs from the DUT 230 may be selected to be the error input for the phase adjust driver 250. Therefore, in the above example, selecting the error input signal of the phase adjust driver 250 to the level driven by the I dc output from the DUT 230 gives the desired output on the Q channel, the response of which can be measured by the LCA 220 to test the DUT 230. A monitor selector 240 controls which of the monitored channel outputs of the DUT 230 is provided as the error input of the phase adjust driver 250 to cause the phase adjust loop 252 to shift the phase of the LO input relative to the Signal input of the DUT.

Referring back to how the error signal is determined and selected, the signal field $E_{10}$ coming from the Mach Zehnder component of the LCA 220 biased at quadrature for AM modulation can be shown to have the form A sin $$\left(\frac{\pi}{V_\pi}V + \frac{\pi}{4}\right).$$

This is not exactly a linear function, but can be expanded in a Taylor series to examine the nonlinearities.

$$E_{10} = A\sin\left(\frac{\pi}{V_\pi}V + \frac{\pi}{4}\right) = \frac{A}{\sqrt{2}}\left[1 + \pi\frac{V}{V_\pi} - \frac{\pi^2}{2}\left(\frac{V}{V_\pi}\right)^2 - \frac{\pi^3}{6}\left(\frac{V}{V_\pi}\right)^3 + \frac{\pi^4}{24}\left(\frac{V}{V_\pi}\right)^4 + \frac{\pi^5}{120}\left(\frac{V}{V_\pi}\right)^5 \ldots\right]$$ Equation (5)

Only the odd powers are relevant since the LCA 220 uses a heterodyne receiver with a narrow passband, which generally eliminates anything other than the driving frequency. The odd terms contribute power back at the driving frequency, but the driving signal is kept small to minimize nonlinearity. Consider Vpeak=0.1 V$\pi$. In this case the 3rd-order term is 1.6% the amplitude of the linear term. The fifth order term is 0.5% of the 3rd-order amplitude.

Even if the odd terms do become somewhat significant in size, their effect merely reduces the amplitude of the signal at the driving frequency. Since these nonlinearities originate from an optical nonlinearity, they are essentially instantaneous and in perfect phase with the driving signal. Raising a cosine function to an odd power does not change the phase of the term at the original frequency.

This realization shows that the modulator of the LCA 220 may be considered to effectively operate as a linear transducer under the above assumptions. This together with the DUT 230 I and Q responses, which are also linear functions of the signal field, gives an overall linear transfer function for the LCA 220 to analyze. It is true that other frequency components will be present in the stimulus of the DUT 230, but they should not affect the measured result, which ignores the harmonic components.

For the case of an unbalanced drive, the Mach Zehnder modulator of the LCA 220 produces the field:

Signal Field: $\overline{E_1} = E_1 e^{j\omega_1 t} =$ Equation (6)

$$E_{10}e^{j\theta_1}\left(1 - je^{j\frac{\pi}{V_\pi}V}\right)e^{j\omega_1 t} \approx E_{10}e^{j\theta_1}\left(1 - j\frac{\pi}{V_\pi}V\right)e^{j\omega_1 t}$$

Since there is a phase shift between the dc and the modulated field, the I and Q outputs become, $$I: E_{10}E_{20}\left[\sin(\theta_1 - \theta_2) + \pi\frac{V}{V_\pi}\cos(\theta_1 - \theta_2)\right]$$ Equation (7)

$$Q: E_{10}E_{20}\left[\cos(\theta_1 - \theta_2) - \pi\frac{V}{V_\pi}\sin(\theta_1 - \theta_2)\right]$$ Equation (8)

In this case, the error input for the phase adjust driver 250 would be the current monitor signals corresponding to the output of the DUT 230 that is under test. For example, if one of the I outputs of the DUT 230 were being tested, then the I dc level would be driven to zero, which gives $\theta_1-\theta_2=0$. This makes the I output proportional to the modulator drive, providing once again a linear system for the LCA 220 to analyze. Setting $\theta_1-\theta_2=\pi$ provides the data for the other diode in the pair as before. It is not necessary to know in advance which error signal from the DUT 230 is provided to the phase adjust driver 250 because the diode illuminated by the selection will be obvious from the phase response. If the response is in-phase with the driving signal at low frequency, then the positive diode is being illuminated.

Selecting the particular desired output of the DUT 230 is made easy by some products, such as the OM4k products available from TEKTRONIX, INC. of Beaverton, Oreg., which include bias monitor circuits. If other types of DUTs not having such monitoring circuits are being tested, the phase adjust driver 250 includes appropriate bias circuitry.

Figure 3:
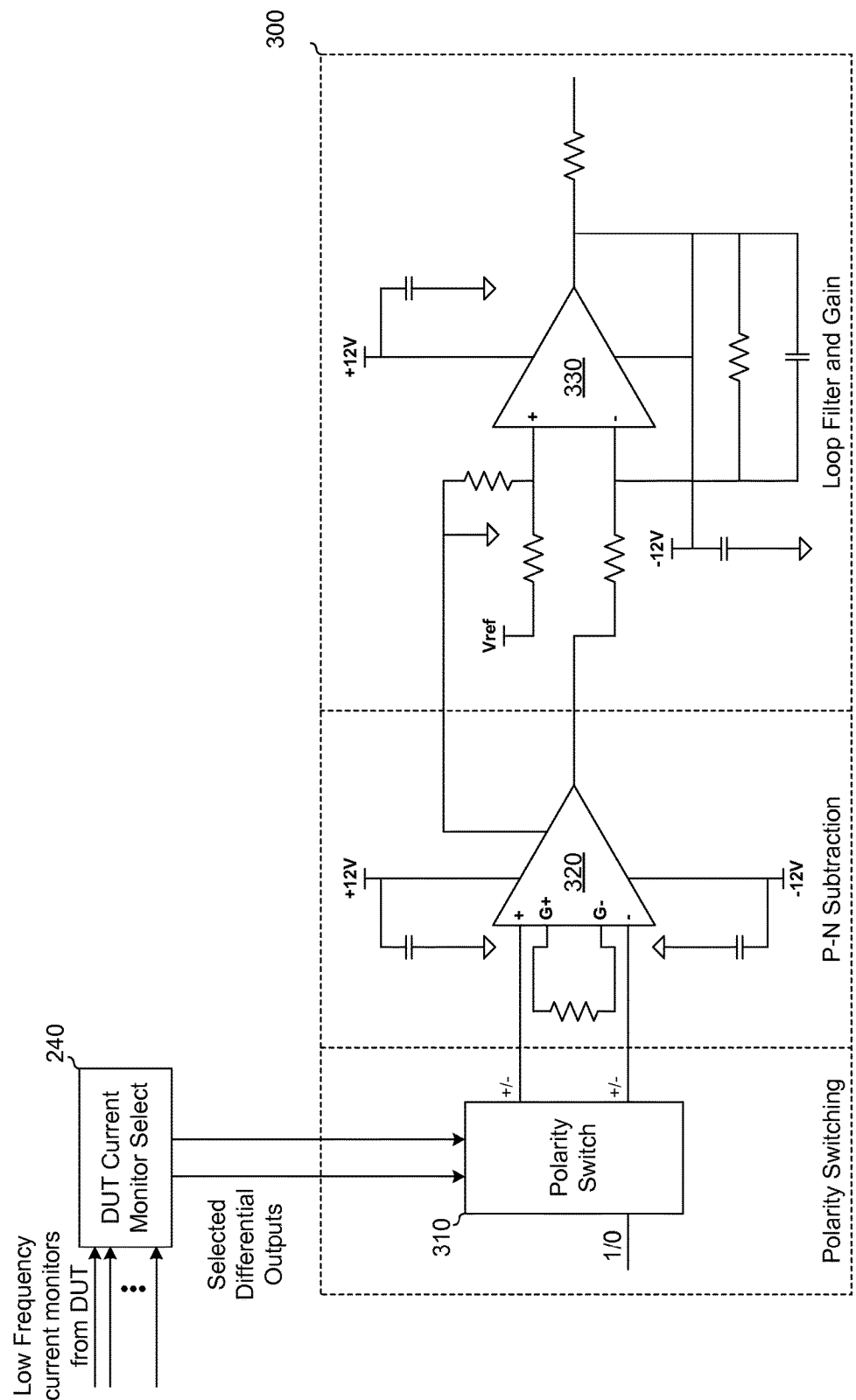
FIG. 3 is a block and schematic diagram illustrating a phase adjust driver according to embodiments of the invention.

FIG. 3 is a block and schematic diagram illustrating a phase adjust driver according to embodiments of the invention. In this example, current monitor outputs are available from the DUT, such as the current monitors 182, 184 of FIG. 1. A monitor selector 240 selects the particular desired outputs from the DUT, which may be a pair of differential photocurrent outputs as illustrated in FIG. 1. The monitor selector 240 passes the selected outputs to a phase adjust driver 300, which may be an embodiment of the phase adjust driver 250 of FIG. 2. The phase adjust driver 300 may include several sections, such as a polarity switching section, a P-N subtraction section, and a section to perform loop filtering and gain.

In operation, the monitor selector 240 passes the selected photocurrent monitor outputs to a polarity switch 310 component of the phase adjust driver 300. The polarity switch 310 allows a user to change the polarity of the error signal, and therefore gives the user control to select which one of the pair of differential output diodes of the selected channel of the DUT will be tested.

The differential inputs, after the desired polarity is chosen by the polarity switch 310, are presented to a differential amplifier 320, which generates a voltage signal indicative of the difference of its input in the P-N subtractor section of the phase adjust driver 300. The output of the differential amplifier 320 is passed to another amplifier 330, which is in the loop filtering and gain section of the phase adjust driver 300. The output of the amplifier 330 is the output of the phase adjust driver 300 that drives the phase adjust loop 252 of FIG. 2, although, in some embodiments, the signal from the amplifier 330 may go through yet another amplifier or series of amplifiers to generate enough gain to drive the phase adjust loop 252.

In operation, the phase adjust driver 300 creates an output signal from an input, which itself is one of the monitored photocurrents of the DUT, for driving the phase adjust loop 252.

The output signal of the phase adjust driver 300 keeps the phase of the LO input extremely precisely aligned with its desired position relative to the Signal input of the DUT. Further, the phase adjust driver 300 allows selection of different relative phases simply by changing which of the monitored photocurrents, of the DUT are chosen to be the selected inputs to the phase adjust driver 300. Plus, the polarity switch 310 allows the user to select which particular photodiode, P or N, of the differential pair of photodiodes is selected.

It shall be well understood to a person skilled in the art that the invention is not limited to any particular standard, but is applicable to systems having similar architecture without depraving from the inventive scope.

The foregoing description has been described for purposes of clarity and understanding. In view of the wide variety of permutations to the embodiments described herein, the description is intended to be illustrative only, and should not be taken as limiting the scope of the invention. Although specific embodiments of the invention have been illustrated and described for purposes of illustration, various modifications may be made without departing from the spirit and scope of the invention. Accordingly, the invention should not be limited except as by the appended claims.

What is claimed is:

1. A phase adjustor for adjusting a phase angle of a local oscillator relative to a phase angle of a signal input of a Device Under Test (DUT), comprising:
    a laser source structured to couple to a lightwave component analyzer and to an optical phase adjustor driven by a phase adjust driver;
    an output of the lightwave component analyzer adapted to couple to a first test input to the DUT;
    an output of the optical phase adjustor adapted to couple to an oscillator input to the DUT; and
    an monitor selector adapted to accept at least two outputs of the DUT and structured to transmit a selected output of the DUT to the phase adjust driver, in which the phase adjust driver is structured to drive the optical phase adjustor with a control signal based on the output of the DUT that is selected by the monitor selector.

2. The phase adjustor for adjusting a phase angle of a local oscillator according to claim 1 in which the optical phase adjustor comprises a fiber optic loop stretcher.

3. The phase adjustor for adjusting a phase angle of a local oscillator according to claim 1 in which a signal path from the laser source through the lightwave component analyzer to the first test input to the DUT has a length within one meter of a length of a signal path from the laser source to the oscillator input to the DUT.

4. The phase adjustor for adjusting a phase angle of a local oscillator according to claim 1 in which the control signal of the phase adjust driver causes a phase angle difference of the output of the lightwave component analyzer and the output of the optical phase adjustor to be controllably driven to approximately zero.

5. The phase adjustor for adjusting a phase angle of a local oscillator according to claim 1 in which the DUT output that is selected by the monitor selector is also a selected input to the lightwave component analyzer.

6. The phase adjustor for adjusting a phase angle of a local oscillator according to claim 1 in which the DUT output that is selected by the monitor selector is different than a selected input to the lightwave component analyzer.

7. A method for adjusting a phase angle of a local oscillator relative to a phase angle of a signal input of a Device Under Test (DUT), the method comprising:
    generating a first laser signal having a fixed path length from a laser to a signal input of the DUT;
    generating a second laser signal having an adjustable length path from the laser to a local oscillator input of the DUT, the adjustable length path including an optical phase adjustor;
    selectively coupling an output of the DUT to a phase controller driver for the controllable loop of fiber optic cable; and
    driving the optical phase adjustor with a control signal derived from the selected output of the DUT.

8. The method for adjusting a phase angle of a local oscillator according to claim 7, in which the optical phase adjustor is a controllable loop of fiber optic cable and in which driving the optical phase adjustor comprises driving a piezo-electric loop stretcher.

9. The method for adjusting a phase angle of a local oscillator according to claim 7, in which a length of the fixed length path is within one meter of a length of the adjustable length path.

10. The method for adjusting a phase angle of a local oscillator according to claim 7, in which driving the optical phase adjustor causes a phase angle difference of the first laser signal and the second laser signal to be driven to approximately zero.

11. The method for adjusting a phase angle of a local oscillator according to claim 7, in which driving the optical phase adjustor causes a phase angle difference of the first laser signal and the second laser signal to be driven to approximately $\pi$.

12. The method for adjusting a phase angle of a local oscillator according to claim 7, further comprising:
    performing tests on the selected output of the DUT.

13. The method for adjusting a phase angle of a local oscillator according to claim 7, further comprising:
    performing tests on an output of the DUT other than the selected output of the DUT.

14. A system for testing a Device Under Test (DUT), comprising:
    a laser source coupled to a lightwave component analyzer and to an optical phase adjustor driven by a phase adjust driver;
    an output of the lightwave component analyzer coupled to a first test input to the DUT;
    an output of the phase adjust driver coupled to an oscillator input to the DUT; and
    a monitor selector adapted to accept at least two outputs of the DUT and structured to transmit a selected output of the DUT to the phase adjust driver, in which the phase adjust driver is structured to drive the optical phase adjustor with a control signal based on the DUT output that is selected by the monitor selector.

15. A system for testing a Device Under Test (DUT) according to claim 14, in which the optical phase adjustor comprises a loop stretcher for stretching a loop of fiber optic cable.

16. A system for testing a Device Under Test (DUT) according to claim 14, in which a signal path from the laser source through the lightwave component analyzer to the first test input to the DUT has a length within one meter of a length of a signal path from the laser source to the oscillator input to the DUT.

17. A system for testing a Device Under Test (DUT) according to claim 14, in which the control signal of the phase adjust driver causes a phase angle difference of the output of the lightwave component analyzer and the output of the optical phase adjustor to be controllable driven to approximately zero.

18. A system for testing a Device Under Test (DUT) according to claim 14, in which the DUT output that is selected by the monitor selector is also a selected input to the lightwave component analyzer.

19. A system for testing a Device Under Test (DUT) according to claim 14, in which the DUT output that is selected by the monitor selector is different than a selected input to the lightwave component analyzer.

* * * * *